United States Patent
Shire

(10) Patent No.: US 12,471,025 B2
(45) Date of Patent: Nov. 11, 2025

(54) POWER SCHEDULING FOR VEHICLE SATELLITE COMMUNICATIONS

(71) Applicant: VOLVO TRUCK CORPORATION, Gothenburg (SE)

(72) Inventor: Joshua Shire, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 360 days.

(21) Appl. No.: 18/332,337

(22) Filed: Jun. 9, 2023

(65) Prior Publication Data

US 2023/0413180 A1 Dec. 21, 2023

(30) Foreign Application Priority Data

Jun. 10, 2022 (EP) .................................. 22178481

(51) Int. Cl.
 *H04W 52/02* (2009.01)
 *H04B 7/185* (2006.01)
 *H04W 4/44* (2018.01)

(52) U.S. Cl.
 CPC .... *H04W 52/0258* (2013.01); *H04B 7/18513* (2013.01); *H04W 4/44* (2018.02)

(58) Field of Classification Search
 CPC ............... H04W 52/0258; H04W 4/44; H04W 52/0216; H04W 52/0254; H04B 7/18513; Y02D 30/70
 See application file for complete search history.

(56) References Cited

U.S. PATENT DOCUMENTS

| | | |
|---|---|---|
| 6,147,644 A | 11/2000 | Castles et al. |
| 6,157,896 A | 12/2000 | Castles et al. |
| 2007/0126647 A1* | 6/2007 | Nelson ................. H01Q 1/18 343/757 |
| 2015/0318916 A1 | 11/2015 | Gopal et al. |
| 2020/0008122 A1 | 1/2020 | Radko et al. |
| 2021/0336691 A1* | 10/2021 | Hong ................... H04W 24/10 |
| 2022/0352976 A1* | 11/2022 | Zavesky ............ H04B 7/18513 |
| 2023/0362704 A1* | 11/2023 | Edge .................. H04W 24/10 |

FOREIGN PATENT DOCUMENTS

| | | |
|---|---|---|
| EP | 3420378 A1 | 1/2019 |
| KR | 20220064340 A | 5/2022 |

OTHER PUBLICATIONS

European Search Report dated Dec. 5, 2022 in corresponding European Patent Application No. 22178481.2, 12 pages.

* cited by examiner

*Primary Examiner* — Harry H Kim
(74) *Attorney, Agent, or Firm* — Venable LLP; Jeffri A. Kaminski

(57) ABSTRACT

A method and related aspects are disclosed for scheduling vehicle-satellite communications for a vehicle comprising a power controller configured to provide power to a satellite communications modem of the vehicle independently of at least a telematics gateway of the vehicle. The method comprises responsive to the power controller of a vehicle receiving a low power mode request, determining a geographic location, for example, a three-dimensional geographic location, of the vehicle, determining a start time when a satellite will next be available for vehicle satellite-communications based on the determined geographic location of the vehicle, and configuring the power controller to schedule a modem power mode wake-up, for example, so that the modem is operational for vehicle-satellite communications, at the determined start-time.

18 Claims, 6 Drawing Sheets

POWER SCHEDULING FOR VEHICLE SATELLITE COMMUNICATIONS

TECHNICAL FIELD

The present disclosure relates to a method for power scheduling for vehicle satellite communications, in particular, but not exclusively to a method of power scheduling system wake-ups independently for a satellite-communications modem and a telematics gateway of a vehicle, which may be a heavy-duty vehicle such as a truck, crane, digger, or the like in some examples.

BACKGROUND

On certain satellite networks, satellites are only overhead for a short period. These periods are predictable based on where a satellite is. However in some situations, where there is only marginal satellite network coverage, vehicle system components used for vehicle-satellite communications may be using energy for a lot of time when there is no opportunity for a satellite-communications enabled vehicle to transmit or receive messages as a direct link with a communications satellite is not available.

U.S. Pat. No. 6,147,644 entitled "Autonomous geolocation and message communication system and method" discloses a system and method for transmitting information to a receiving station via one or more Low Earth Orbit (LEO) satellites which includes a device which is capable of operating autonomously to transmit signals to a selected LEO satellite for relay to a receiving station identifying the device and its geolocation including longitude and latitude and/or speed, altitude and heading or course. The device includes a microprocessor which operates a Global Positioning System (GPS) receiver for receiving GPS signals to identify its geolocation and precise time. A non-volatile memory on board the device stores LEO satellite ephemeris data, and identification, operational and message formatting information to enable the device to transmit information including voice, data and/or the geolocation of the device to a selected LEO satellite, such as the next visible LEO satellite, for relay to a receiving station. The device may be operated to select the next visible LEO satellite for transmission of information when the satellite is visible and the device is within the LEO satellite visibility range or footprint. Alternatively, the device may select one or more LEO satellites for transmission at selected times and may store information, including geolocation data, when a selected LEO satellite is visible."

U.S. Pat. No. 6,157,896 entitled "Geolocation communications method during visibility between an earth-orbit satellite and a transmitter and receiver" discloses a method for determining the geolocation of an object such as a vehicle traversing the earth's surface or airborne there above includes employing a device which is capable of operating autonomously to transmit signals to a selected low earth orbit (LEO) satellite for relay to a receiving station whose position is known, identifying the device and its geolocation, speed, altitude and/or heading. The device includes a microcomputer which operates a Global Positioning System (GPS) receiver for receiving GPS signals to identify the device geolocation and the precise time. A non-volatile memory on board the device stores LEO satellite ephemeris data, satellite operational and message formatting parameters, LEO satellite visibility footprint data and visibility contour information for the device caused by obstacles which are permanently or temporarily in proximity to the device during deployment and which block transmission of signals between the device and the LEO satellite, depending on relative positions. Geolocation information is transmitted to a LEO satellite for relay to the receiving station after calculation of covisibility of the satellite with the receiving station and the transmitter antenna for the device, taking into account the device visibility contour and heading. The device transmitter antenna may have a steering mechanism for causing the antenna to be aimed at a predetermined azimuth and elevation wherein the transmitted signals will be intercepted by the LEO satellite.

The disclosed technology seeks to mitigate, obviate, alleviate, or eliminate various issues known in the art which affect the ability of a vehicle to use a satellite-communications network.

SUMMARY

Whilst the invention is defined by the accompanying claims, various aspects of the disclosed technology including the claimed technology are set out in this summary section with examples of some preferred embodiments and indications of possible technical benefits.

A first aspect of the disclosed technology relates to a method for scheduling vehicle-satellite communications for a vehicle comprising a power controller configured to provide power to a satellite communications modem of the vehicle independently of at least a telematics gateway of the vehicle, the method comprising: responsive to the power controller of a vehicle receiving a low power mode request: determining a geographic location of the vehicle, determining at least a start time when a satellite will next be available for vehicle satellite-communications based on the determined geographic location of the vehicle and configuring the power controller to schedule a modem power mode wake-up at the determined start time.

Advantageously, by determining at least the start of a time-window for vehicle-satellite communications, there is no need to maintain system components which are only used for vehicle-satellite communications in a full power operational mode at other times when satellite-communications are not available. This saves the energy such system components would otherwise consume if they were to remain fully operational. Instead, they can be maintained in low power mode with limited functionality such as in a stand-by mode or, in some embodiments, in a no power mode.

In some embodiments, determining at least a start time when a satellite will next be available for vehicle satellite-communications based on the determined geographic location of the vehicle comprises the vehicle determining unobstructed, for example, visible, sky to determine a time-window for vehicle-satellite communication using topology information for its location.

In some embodiments, determining at least a start time when a satellite will next be available for vehicle satellite-communications based on the determined geographic location of the vehicle comprises the vehicle detecting visible sky to determine a time-window for vehicle-satellite communication using one or more image or infra-red or similar sensors to scan for unobstructed sky.

A technical benefit of using only sensors to scan for unobstructed, for example, visible, sky is that the actual line-of-sight span of sky available from the vehicle can be used with the satellite orbit data to provide a more accurate indication of the duration of the time-window and its start time. This is particularly useful if the landscape has changed and the topography information is out of date. For example, if the vehicle is located in a quarry or open mine type of site, the floor of the quarry may be lower than topography information indicates, meaning that the time-window may be less than would otherwise be indicated by topography information alone. If, for example, the vehicle was located in a mining area where a hill was being blasted, the actual unobstructed view of the sky may be bigger than would be indicated by topography information if this was based on the hill before it was blasted. Accordingly to maximise the efficiency of any transmission window for vehicle-satellite communications, the degree of accuracy for determining the actual time window available can be considerably enhanced by using the vehicle's sensors to scan for unobstructed sky, even if the vehicle is at its expected geographic location.

In some embodiments, the server or the vehicle determines unobstructed sky based only on topography data for the vehicle's location.

In some embodiments, the vehicle determines unobstructed sky based only on its sensors analysing the sky.

In some embodiments, the unobstructed sky may be determined based on a combination of topography data and sensor analysis of the sky.

In some embodiments, the server may determine unobstructed sky based on topography information for the vehicle's location and the vehicle may further adjust the amount and location of unobstructed sky determined by the sensor by using its sensors to analyse the sky at its location to detect unobstructed sky.

In some embodiments, the scheduled modem power wake-up is configured so that the modem is fully operational when the satellite becomes available for vehicle-satellite communications. In other words, the scheduling determines predicted amount of time for the modem to return to its fully operational mode from its no or low-power mode and schedules the modem to wake-up by this amount in advance of when the satellite becomes available, in other words, the start-time is set slightly ahead of when the satellite become available so as to allow the modem to become fully operational.

Advantageously, the modem is then fully operational even in narrow time-windows for vehicle-satellite communications which may prevent situations where a time-window for vehicle-satellite communications is missed or not fully capable of being used because the modem is taking too long to power up.

In some embodiments, the location data for the vehicle includes three-dimensional location data, other words, 3D map data, and the determined start time is based on the surrounding three-dimensional terrain. Advantageously this may provide more accurate time window as it allows a line-of-sight between the vehicle and the satellite to be modelled more accurately than in 2D map data is used.

In some embodiments, the low power mode request is a request for lowering the power consumption of the vehicle's system components, in other words, it comprises a low power mode request for the vehicle system components.

In some embodiments, the low power mode request is a low power mode request for vehicle system components comprising the vehicle's telematics gateway and satellite-modem.

The system components may be automatically entered into a low-power mode to conserve the vehicle's battery resources, and advantageously the disclosed technology allows the vehicle to store out-going messages and buffer received messages for sending out from the vehicle and processing on the vehicle when the satellite-communications modem becomes operational again and the satellite becomes available.

In some embodiments, the scheduled modem power mode wake-up wakes up the vehicle modem when the telematics component of the vehicle is powered-off or in a low-power mode.

In some embodiments, the method further comprises determining a time when the satellite will become unavailable after the next time it becomes available and configuring the power controller to schedule a modem low power mode at the time when the satellite will become unavailable.

Satellite-communications enabled vehicles are typically operated according to the needs of their primary function and not turned on specifically to transmit or receive messages over a satellite network. Accordingly, adapting such vehicles to implement an embodiment of the method of scheduling vehicle-satellite communications where the vehicle system components are able to enter a low power mode, for example, where the modem and/or telematics gateway are turned off, may help such vehicle better manage their limited reserve battery power.

In some embodiments, the satellite communications modem comprises an independently powered incoming message buffer, and the method further comprises maintaining the incoming message buffer when the telematics gateway is in a low-power state and storing at least one incoming message received via a vehicle-satellite communications link when the telematics gateway is in the low-power state.

In some embodiments, the satellite communications modem comprises an independently powered outgoing message buffer and the method further comprises the telematics gateway interacting with the outgoing message buffer to cause messages to be stored in the buffer when the satellite communications modem is in the low-power state.

In some embodiments, the method further comprises scheduling a time-interval for the telematics gateway to interact with the incoming message buffer and/or the outgoing message buffer when the satellite communications modem is in a low-power state.

In some embodiments, determining a time when a satellite will next be available for vehicle satellite-communications based on the determined geographic location of the vehicle comprises determining a time when the satellite will be located above a predicted geographic location of the vehicle for direct satellite communications.

In some embodiments, the method further comprises automatically emptying the outgoing message buffer of the modem when the modem is powered on and a vehicle-satellite communications link is available.

A second aspect of the disclosed technology relates to a vehicle satellite-communications scheduler for scheduling vehicle satellite-communications for a vehicle having a power controller, wherein the scheduler is configured, responsive to the power controller receiving a low power mode request, to determine a geographic location of the vehicle, determine a time when a satellite will next be available for vehicle satellite-communications based on the determined geographic location of the vehicle and configure the power controller to schedule a modem power mode wake-up at the determined time.

In some embodiments, the scheduler is further configured to determine a time when the satellite will become unavailable after the next time it becomes available and configure the power controller to schedule a modem low power mode at the time when the satellite will become unavailable.

A third aspect of the disclosed technology relates to an on-board vehicle satellite-communications scheduling system, the communications scheduling system comprising a power controller configured to control a satellite communications modem of the vehicle independently from a telematics gateway of the vehicle, a satellite-communications scheduler configured to determine, based on a geographic location of the vehicle, when a direct communications link can be established with a satellite, generate a power request to wake-up a satellite communications modem of the vehicle at a scheduled time when the direct communications link with the satellite can be established and send the request to the power controller, where the power controller is configured, responsive to receiving the request, to cause the satellite communications modem to change from a lower power mode to wake-up and operate at the scheduled time without changing the telematics gateway power mode.

In some embodiments of the on-board vehicle satellite-communications scheduling system the system is configured to perform a method according to one of the disclosed embodiments of the method aspect.

A fourth aspect of the disclosed technology comprises a vehicle comprising a telematics gateway, a satellite communications modem, an electronic control unit and an on-board vehicle satellite-communications scheduling system according to the third aspect of any one of its disclosed embodiments, and a power controller configured to independently power at least the modem from the telematics gateway of the vehicle, wherein responsive to the power controller receiving a request for the telematics gateway of the vehicle to go to a lower power mode, the scheduling system determines, based on a current geographic location of the vehicle, a time when a direct-link with an over-head satellite will next be available, and requests the power controller schedules a modem power mode wake-up at the determined time and a subsequent shutdown of the modem to a low-power mode when the direct-link with a satellite is no longer available.

The electronic control unit may comprise a control system according to the fifth aspect in some embodiments and/or control memory and/or one or more processors or processing circuitry of the vehicle in some embodiments in order to cause computer program code loaded in the memory to be executed by the one or more processors in order to implement a method according to the method aspect or any one of its disclosed embodiments.

In some embodiments, the modem includes an out-going modem buffer, wherein the telematics gateway is configured to interact with the modem buffer to cause out-going messages to be stored in the out-going modem buffer when the modem is in the low-power state.

In some embodiments, the modem includes an incoming modem buffer, wherein when the telematics gateway is in a low power state, the modem causes incoming messages to be stored in the incoming modem buffer, and the messages are made available to the telematics gate when the modem is in a low-power state.

A fifth aspect of the disclosed technology comprises a control system or circuitry for a vehicle, the control system comprising memory, one or more processors or processing circuitry, and computer-program code which, when loaded from memory and executed by the one or more processors causes the vehicle to implement a method according to the above method aspect or any of its disclosed embodiments.

A sixth aspect of the disclosed technology comprises a computer program product comprising computer-code which when loaded from memory and executed by one or more processors of a control system or circuitry of a vehicle, causes the vehicle to implement a method according to the above method aspects or any one of its disclosed embodiments.

Another aspect of the disclosed technology comprises a computer-readable storage medium comprising computer-program code which, when executed by one or more processors or processing circuitry of an apparatus, causes the apparatus to implement a method according to the first aspect.

Another aspect of the disclosed technology comprises a computer program carrier carrying a computer program comprising computer-program code, which, when loaded from the computer program carrier and executed by one or more processors or processing circuitry of an apparatus causes the apparatus to implement a method according to the first aspect, wherein the computer program carrier is one of an electronic signal, optical signal, radio signal or computer-readable storage medium.

A computer program comprising program code means for performing the method aspect or any of its disclosed embodiments when said computer program is run on one or more processors or on processing circuitry of an electronic control unit of a vehicle.

Another aspect of the disclosed technology comprises a control system or circuitry for a vehicle having an automated driving system, ADS, the control system or circuitry comprising memory, one or more processors or processing circuitry, and computer-program code which, when loaded from memory and executed by the one or more processors causes the control system to implement a method according the first aspect.

Another aspect of the disclosed technology comprises a computer program product stored on or configured to be provided to and used by a device mounted on or integrated in a vehicle according to the fourth aspect or any of its preferred embodiments, wherein the computer program product comprises computer-code which when loaded from memory and executed by one or more processors or processing circuitry of a control system of the vehicle, causes the vehicle to implement a method according to the first aspect or any of its preferred embodiments.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION

Figure 1:
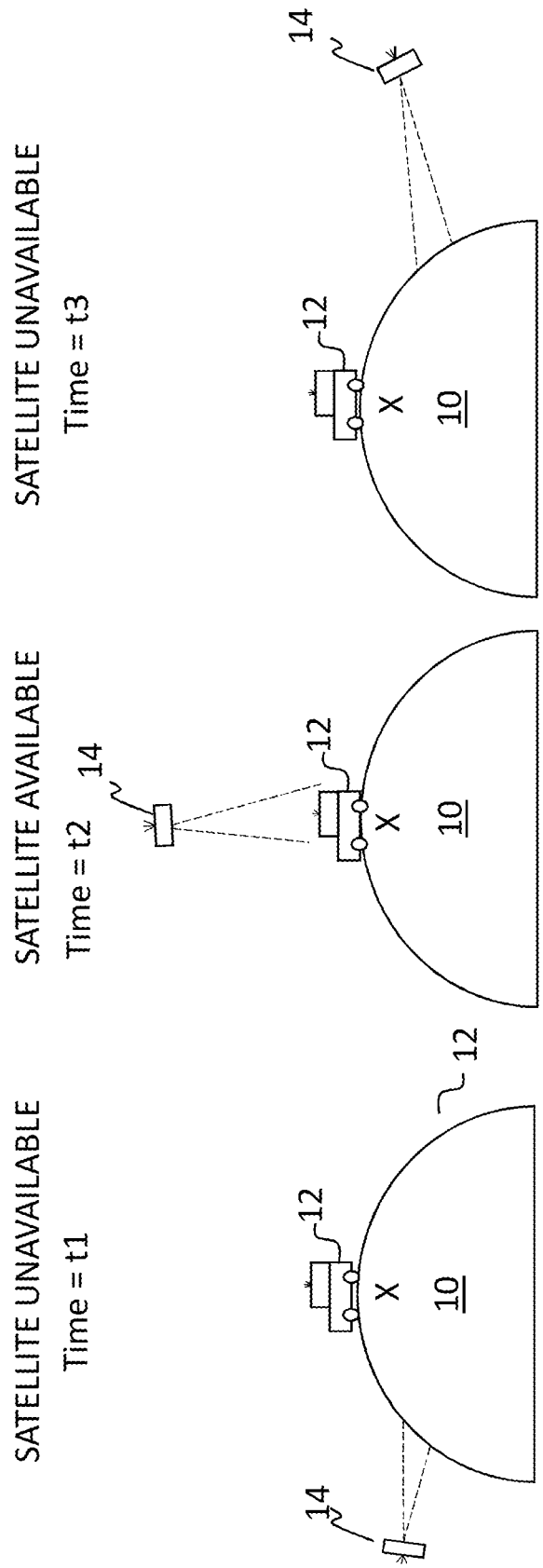
FIGS. 1A to 1C illustrate schematically a first example time-window of vehicle-satellite communications availability.
Figure 2:
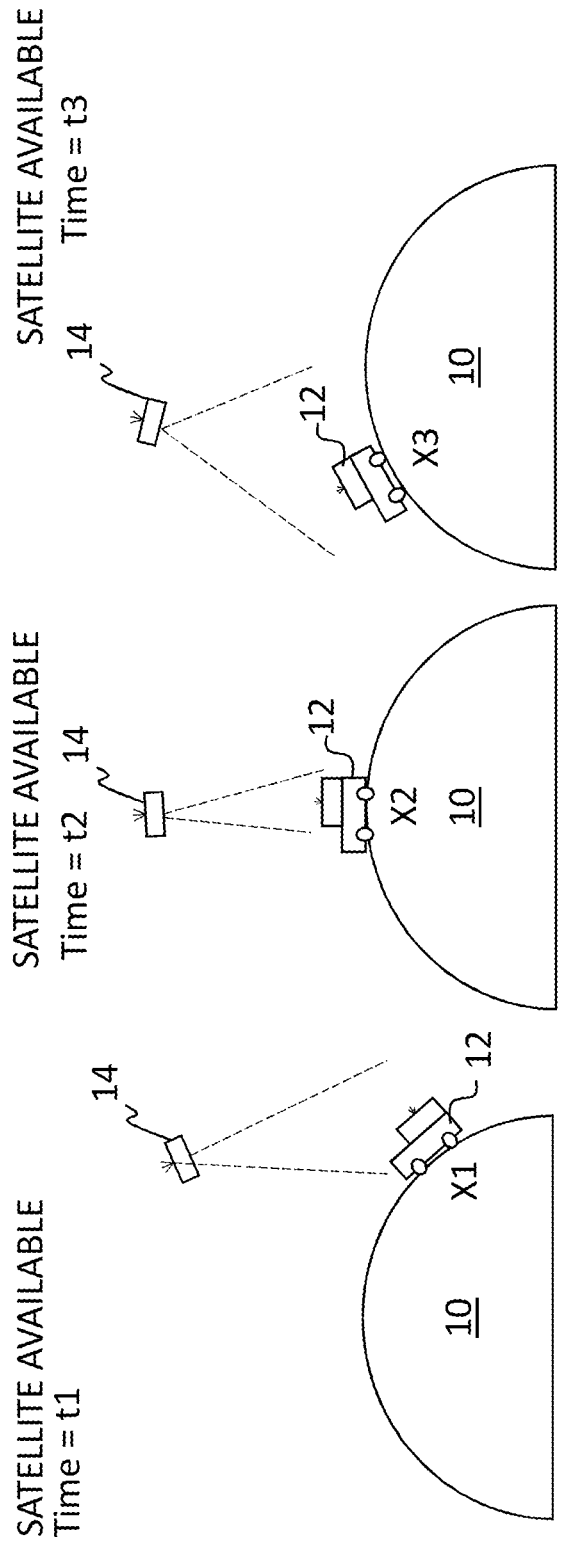
FIGS. 2A to 2C illustrate schematically a second example time-window of vehicle-satellite communications availability.
Figure 3:
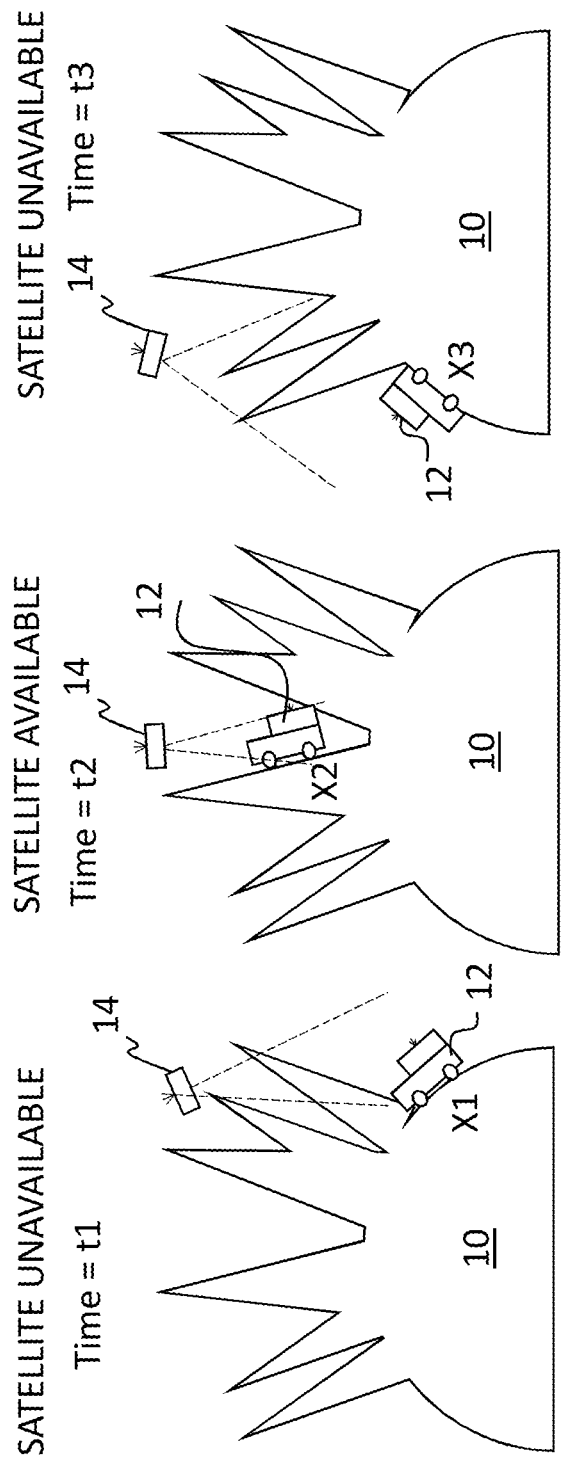
FIGS. 3A to 3C illustrate schematically a third example time-window of vehicle-satellite communications availability.

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

FIGS. 1A to 1C, 2A to 2C, and 3A to 3C of the accompanying drawings illustrate schematically examples of a time-window for vehicle-satellite communications availability. In FIG. 1A, a communications satellite 14 at time t1 cannot directly communicate with a stationary vehicle 12 at location X as the satellite's orbital position means that the Earth, in other words terrain has blocked a direct link, in other words a line-of-sight communications channel, with the vehicle 12. At time t2 however the satellite's orbit passes over the vehicle's location X and vehicle-satellite communications are possible via a direct link between the vehicle 12 and the overhead satellite 14. By time t3 however, the satellite has moved along its orbit and is no longer within range of the vehicle, and vehicle-satellite communications are not possible.

FIGS. 2A to 2C show an example of a long time-window for vehicle-satellite communications in part as the communications satellite has a wide network coverage area, and in part due to the surrounding terrain not obstructing communications. If the vehicle's trajectory from location X1 shown in FIG. 2A via X2 shown in FIG. 2B to location X3 shown in FIG. 2C follows the orbit to some extent this may also extent the time-window for vehicle-satellite communications.

FIGS. 3A to 3C shows schematically an example of a short time-window for vehicle-satellite communications where the terrain (not drawn to scale) over which a vehicle is travelling limits the period of time when a direct link between a vehicle and a communications satellite could be formed. In FIG. 3A, at location X1, the vehicle's line of sight to form a direct satellite link with communications satellite 14 is blocked by mountainous terrain. FIG. 3B shows schematically the vehicle at a location X2 in a deep depression or valley within mountainous terrain, has severely limited the time-window for vehicle-satellite communications. FIG. 3C shows schematically how the vehicle's line of sight is block again for direct satellite communications with satellite 14 at location X3.

FIGS. 1A-3C accordingly collectively demonstrate that in any 24-hour period based on the vehicle location and surrounding terrain characteristics, as well as the orbital path of the satellite, direct vehicle-satellite communications may be limited to short periods of time in any 24-hour period when the satellite's orbital position is sufficiently over the vehicle's geographic location on the Earth. This means that in certain areas of terrain, such as by mountainous terrain, or in a depression such as a valley or open-cast mine or the like, vehicles, particularly heavy-duty vehicles such as trucks and mining equipment, which are operating in such sites and locations, will have a relatively short period of time for satellite communications compared to vehicles which are located in more open terrain at different geographic locations.

The disclosed technology seeks to conserve as much power as possible for the vehicle's primary tasks by managing the power supplied to the vehicles system components in an intelligent way by providing a vehicle-satellite communications modem which can be powered independently of a vehicle's telematics gateway.

Figure 4:
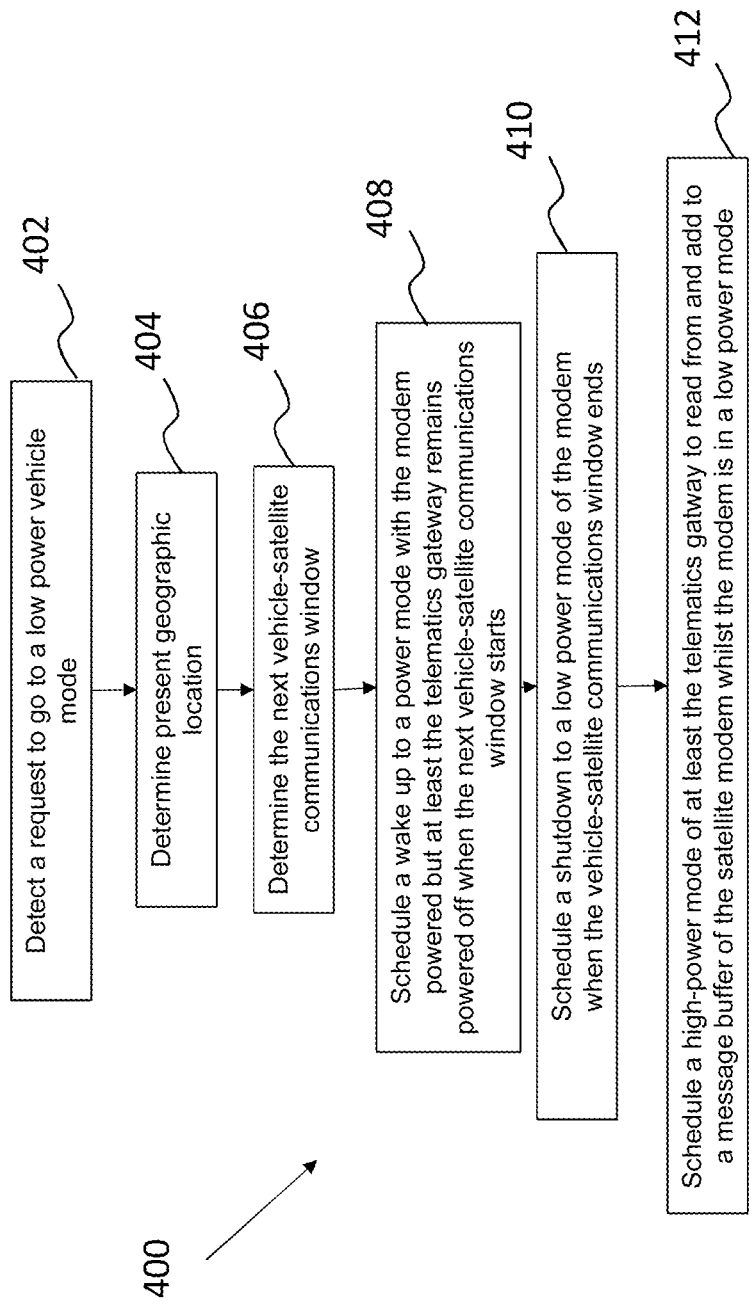
FIG. 4 illustrates schematically a method for scheduling vehicle satellite-communications according to some embodiments of the disclosed technology.

FIG. 4 shows an example embodiment of a method 400 of scheduling vehicle-satellite communications according to the disclosed technology. As shown in FIG. 4, the method 400 is performed by a vehicle having a satellite communications modem and a telematics gateway and a power controller configured to provide power to the satellite communications modem of the vehicle independently of the telematics gateway of the vehicle 12. In some embodiments the method 400 is performed by a telematics gateway, for example, a systems mode manager of a telematics gateway. In some embodiments, the method 400 may be performed by a systems mode manager of a telematics gateway such as telematics gateway 608 of the vehicle 12 shown in FIG. 6 for example. The power controller may be a power controller such as the power controller 602 shown in FIG. 6, which may be an integral part of an electronic control system or unit, such as the electronic control unit, ECU, 618 shown in FIG. 6 and described in more detail later below.

As shown in FIG. 4, the method 400 comprises, responsive to the power controller of a vehicle receiving a low power mode request in 402, determining a geographic location of the vehicle in 404, and determining a time when a satellite will next be available for a direct vehicle satellite-communications link based on the determined geographic location of the vehicle in 406, in other words, when will the satellite be sufficiently overhead for the vehicle to be within its area of network coverage. This may be limited to when the satellite is directly over the vehicle depending on local terrain.

The method then comprises scheduling a wake-up to a power mode where the satellite communications modem is powered but the telematics gateway of the vehicle, and possible one or more or all of the other vehicle systems components, are shut down in 408. The determined geographic location of the vehicle may include timing information for that location, for example, it may comprise time-stamped location information to enable current and predicted locations to be used to assess when a time-window for vehicle-satellite communications. The location information may be provided using global positioning system, GPS, coordinates in some embodiments.

Figure 5:
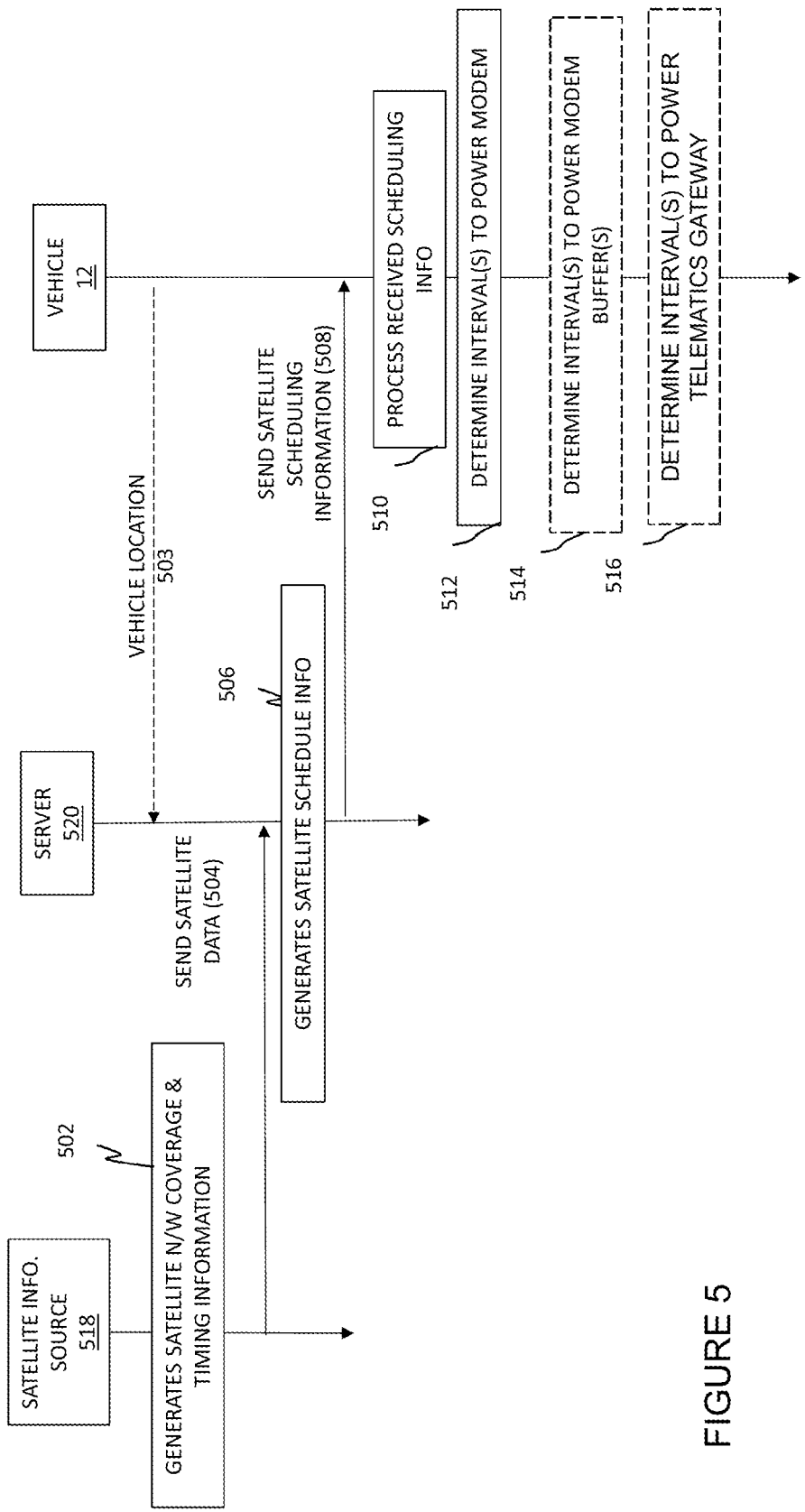
FIG. 5 illustrates schematically how satellite location information is obtained according to some embodiments of the disclosed technology.

In some embodiments, method 400 may be executed by a remote server such as the server 520 shown schematically in FIG. 5, with the additional step of sending the scheduling information for waking-up and powering-down the model to the vehicle. The vehicle then may use this information to schedule the telematics gateway power modes (shown as 412 in FIG. 4). Alternatively, the remote server 520 may send the telematics gateway scheduling information to the vehicle as well in some embodiments.

Alternatively, the method 400 may be performed on-board by the vehicle 12 in some embodiments.

In embodiments where, for example, the start and stop times of any time-window for vehicle-satellite communications are sent by a server, for example, as satellite scheduling information 508 sent by the server 520 shown in FIG. 5, to the vehicle 12, the vehicle may be configured to detect or determine unobstructed sky, for example, visible sky to further adjust the predicted start and end of the time-window for vehicle-satellite communications. This may involve the vehicle predicting the unobstructed sky based off known topology and/or detecting unobstructed sky using its sensor system to scan for visible sky. This may allow the scheduled time-window for vehicle-satellite communications received from the remote server to be more finely adjusted by the vehicle, in some embodiments, as the unobstructed sky over which the satellite's orbit passes may be more accurately determined using the vehicle's sensors. For example, if the topography information is out of date, or if the vehicle is operating in an open-mine, or quarry, where the bottom of the quarry may be lower than topography information indicates (which would narrow the time-window), or if ground is blasted away (in which case the time-window may be larger than historical topography information indicates).

By directly analysing the sky at the vehicle's location, a more accurate determination of the time window may be achieved when for example the geographical position is incorrectly determined or that the determined geographical position has a low accuracy in other words, if the actual position of the vehicle is different from the determined geographical position. Advantageously, this may also be useful if, for whatever reason, the vehicle is not located at the geographic position that the remote server used to generate its scheduling information.

In embodiments where method 400 is performed by the vehicle, then the vehicle can determine a time-window for vehicle-satellite communications in the same way by detecting or determining unobstructed, for example visible, sky to determine the time-window for vehicle-satellite communications so as to manage when it needs to power on and/or power off. This may involve the vehicle predicting the unobstructed, for example, visible, sky based off known topology, for example, topology information stored on board, or by using its sensor system to scan for unobstructed sky. The sensors may comprise optical sensors or radar type sensors, or infra-red sensors which are capable of distinguishing sky from the vehicle's surroundings. LIDAR and radar sensors may also be used which may help detect unobstructed sky at night or in low-visibility conditions such as in fog or mist.

The altitude and terrain around the vehicle may also affect the availability of a direct line of sight to the satellite, in other words, the line-of-sight may need to be based on a three-dimensional representation of the vehicles location based on its map, for example, GPS, coordinates. Three-dimensional surface data repositories are available for obtaining a three-dimensional view of the ground around the vehicle modelling the line of site to a satellite from a vehicle on the ground. See, for example, see the 3D geographic data from https://www.wrld3d.com.

The server or the vehicle may each or both determine unobstructed sky, for example, the server or the vehicle may determine unobstructed sky based only on topography data for the vehicle's location. However, in some embodiments, the vehicle may determine unobstructed sky based only on its sensors analysing the sky. The unobstructed sky may also be determined based on a combination of topography data and sensor analysis of the sky in some embodiments, for example, the server may determine unobstructed sky based on topography information for the vehicle's location and the vehicle may further adjust the amount and location of unobstructed sky determined by the sensor by using its sensors to analyse the sky at its location to detect unobstructed sky.

In some embodiments, the method may further comprise scheduling a shutdown to a low power mode of the modem, for example, the modem may be powered off or enter a low-energy consuming standby state with limited functionality, when the vehicle-satellite communications window ends in 410.

The vehicle's satellite communications modem can also maintain a buffer of messages to transmit, and those that have been received, even if the telematics gateway (and the telematics gateway) is powered down.

In some embodiments, the method may further comprise, scheduling when the modem telematics gateway can interact with one or more modem buffers in 412 to cause outgoing messages to be stored in an outgoing modem buffer when the modem is in a low-power state with no or limited functionality and to cause the telematics gateway to read incoming messages that have been stored in the modem buffer when the telematics gateway and/or other system components were in a low or no power state.

In some embodiments, the method may further comprise, scheduling an interval base when the modem telematics gateway can interact with independently powered one or more modem buffers of the modem. This allows the telematics gateway to cause outgoing messages to be stored in an outgoing modem buffer of the modem even when the modem is still in a low-power state with no or limited functionality. The telematics gateway may also read incoming messages that were stored in the modem buffer when the telematics gateway was in a low or no power state.

In some embodiments, the telematics gateway and modem together can be powered independently of the rest of the vehicle. They may also each be independently powered up and down in some embodiments, for example, by the power controller of the vehicle, so as to be woken up and shut-down on a schedule determined by when a direct link with an over-head satellite is available.

Figure 6:
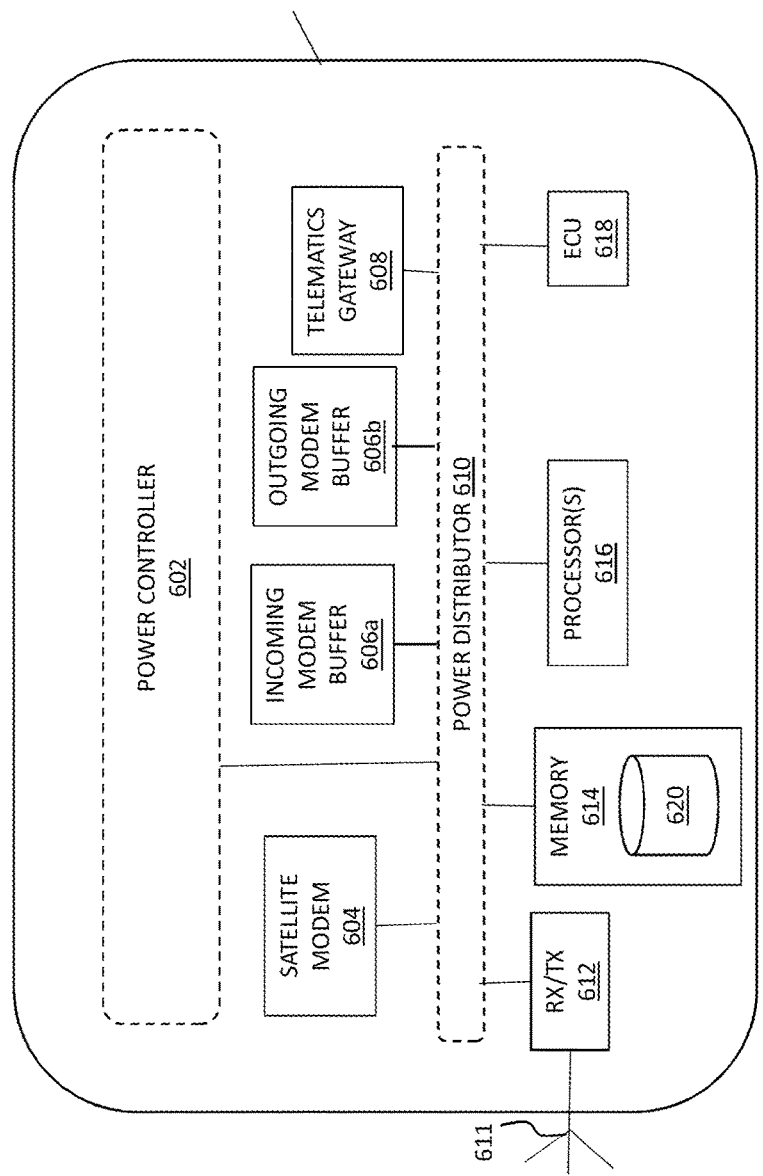
FIG. 6 illustrates schematically a vehicle system according to some embodiments of the disclosed technology.

In some embodiments of method 400, the method schedules vehicle-satellite communications for a vehicle having a power controller, such as for example, power controller 602 shown schematically in FIG. 6, wherein the power controller is configured to provide power to a satellite communications modem 604 of the vehicle 12 independently of at least a telematics gateway (see 608 in FIG. 6 for example) of the vehicle. The method 400 comprises, the power controller of the vehicle receiving a low power mode request which will at least power down the vehicle's satellite communications modem, and may power down one or more other components of the vehicle 12, such as its telematics gateway. Response to receiving the low power request, a vehicle-satellite scheduler of the vehicle determines a geographic location of the vehicle, determining a time when a satellite will next be available for vehicle satellite-communications based on the determined geographic location of the vehicle and, for example, satellite scheduling data providing orbit location information for the satellite, and configuring the power controller to schedule a modem power mode wake-up at the determined time. The satellite scheduling data may be acquired from any suitable source of such information, for example, it may be acquired from a back-office server 520 (see FIG. 5 for example) or directly from, for example, a server 518 configured to provide such satellite information, for example, a server 518 associated with a satellite network operator.

In some embodiments, the low power mode request is a low power mode request for at least the vehicle's telematics gateway and satellite communications modem system components to enter a low-power or no power state, and may comprise a request for other system components to be powered down to a low or no-power state.

In some embodiments, the scheduled modem power mode wake-up wakes up the vehicle modem whilst keeping the telematics gateway (component of the vehicle is powered-off. The method may also comprise determining a time when the satellite will become unavailable after the next time it becomes available and configuring the power controller to schedule a modem low power mode at the time when the satellite will become unavailable. For example, based on the terrain surrounding the geographic location of the vehicle, a satellite may be come unavailable slightly ahead of the time at which direct vehicle-satellite communications should no longer be available (for example, if the vehicle is in a valley or, for example, the bottom of an open mine). The satellite may also be available slightly later (for example, if the vehicle is on top of a mountain with a clear view of the surroundings so that an extended line of view to the satellite is supported).

In some embodiments, the method also comprises maintaining a modem buffer for storing messages when the telematics gateway is in a low-power state.

In some embodiments, the method further comprises the telematics gateway interacting with the modem buffer to cause messages to be stored in the modem buffer when the modem is in the low-power state. In some embodiments, the method further comprises scheduling a time-interval when the modem buffer is available for the telematics gateway to interact with.

In some embodiments, determining a time when a satellite will next be available for vehicle satellite-communications based on the determined geographic location of the vehicle comprises determining a time when the satellite will be located above the geographic location of the vehicle for direct satellite communications. In some embodiments, however, the method also comprises determining a time when a satellite will next be available for vehicle satellite-communications based on the determined geographic location of the vehicle comprises determining a time when the satellite will be located above a predicted geographic location of the vehicle for direct satellite communications. Reference to "above" as used herein include both directly overhead and also to a wider range of angles if the terrain around the vehicle does not block the line of sight from the vehicle to the satellite unless the context clearly indicates otherwise.

The method may also comprise automatically emptying the outgoing message buffer of the modem by transmitting the messages stored in the outgoing message buffer as soon as possible after the satellite communications modem 14 is powered on and a vehicle-satellite communications link is available.

FIG. 5 shows an example system for scheduling vehicle-satellite communications according to some embodiments of the disclosed technology. As shown in FIG. 5, a satellite position information source 518, for example, a satellite network operator, generates in 502 satellite data comprising satellite network area coverage and timing information based on where a communications satellite will be positioned on its orbit in any given 24 hour period. This satellite data is sent in 504 by the satellite information source 16 either directly to the vehicle or to a server 520 such as is shown in FIG. 5.

As shown in the example embodiment of FIG. 5, server 520 is configured to provide back-office support and control functionality to at least one vehicle 12, but may provide support to multiple vehicles 12, for example, to a fleet of vehicles 12 which may be configured to report their locations from time to time to the server 520 as shown schematically by 503 in FIG. 5.

The server 520 is configured to receive location based information for the one or more vehicles 12, for example, GPS location data. Alternatively, or in addition, in some embodiments, the satellite data may also include vehicle location data determined by a location and/or communications satellite 14. Based on at least the received vehicle location data and the satellite data providing information about the satellite orbital position and network coverage, and, in some embodiments, information about the type of terrain around the vehicle's ground location, generates satellite scheduling information in 506 by determining a time-window for vehicle-satellite communications when the location of a vehicle is within the area of network coverage of the satellite.

In some embodiments, based on one or more characteristics of the terrain in the region around the vehicle 12, the time-window for vehicle-satellite communications is reduced to take into account the type of terrain and its height, for example, any tall buildings or hills or other features which may cause an obstruction in the vehicle's line of sight to the satellite as it passes overhead. The scheduled time-window for vehicle-satellite communications in any 24 hour period is then sent in 508 by the server 520 to a vehicle 12 in the form of a suitable message format, for example, as a SWAP, Software Application Protocol, message which may be a JSON or ASN.1 format-type message which is transmitted according to a SWAP specification used.

The vehicle 12 processes in 510 the received scheduling information and uses this to determine one or more time intervals for when to power on the modem in 512 so that it wakes up and is operational only when there exists a time-window for vehicle-satellite communications. In other words, the modem is woken up sufficiently in advance of when the satellite is scheduled to be overhead so that its operational when the satellite is overhead. Here "overhead" means in reality that the vehicle's geographic location is within the satellite's area of network coverage and the line of sight from the vehicle to the satellite is not obscured, which in a narrow valley or the like, could mean directly overhead but may include a wider range of angles if there are no obstructions in the vicinity of the vehicle's location.

In some embodiments, the scheduling information is also processed by the vehicle to determine one or more time intervals, in other words, start times and stop times. for powering the telematics gateway in 514 and/or time intervals for the incoming and/or outgoing modem buffers in 516. The same time interval may be set for both incoming and out-going modem buffers to be awake and available, but in some embodiments they are separately powered. In some embodiments, the modem's outgoing message buffer is independently powered from the incoming message buffer of the modem.

FIG. 6 shows another aspect of the disclosed technology which comprises a vehicle 10 having a power controller 602. Vehicle 10 comprises a power controller 602 configured to power a plurality of system components of the vehicle 10 via a power distributor 610, for example, a power bus. For example, as shown in FIG. 6, the vehicle 10 system components include but are not necessarily limited to a satellite communications modem 604, an incoming message modem buffer 606a, an outgoing message modem buffer 606b, and a telematics gateway 608. Also shown in FIG. 6 as a system component is transceiver arrangement 612 which is used by the vehicle to communicate wirelessly via one or more communications networks, for example it may comprise an antenna arrangement used by the satellite communications modem 604. In some embodiments, the transceiver TX/RX 612 may also provide access to Wi-Fi and cellular data communications networks.

As shown in FIG. 6, the vehicle 12 also includes suitable memory 614, one or more processors or processing circuitry 616 and a suitable controller or control circuitry, for example, an electronic control unit 618 may be provided in some embodiments for controlling the operation of the system components, including the operation of the power controller 602.

In some embodiments, the vehicle 12 may comprise an autonomous or semi-autonomous vehicle, then a suitable sensory system (not shown in FIG. 6) may also be provided to assist with navigation of the vehicle.

As shown in FIG. 6, the power controller 602 is configured to cause the power distributor to separately power the satellite communications modem 604, the satellite communications modems 606a, 606b, and also the telematics gateway 608 from the rest of the system components which allows the vehicle to have two or more system power modes operating at the same time, for example, the satellite communications modem may be fully operational whilst the telematics gateway is in a low or no power state and vice versa. In addition, the satellite incoming modem buffer 606a may be separately powered from the outgoing modem buffer 606b and both may be separately powered from the modem 604. This allows the satellite communications modem to periodically power-up when communications satellites are expected to be overhead, in other words, when the vehicle 12 is within range of the satellite 14 and has a line of sight to the satellite so as to be able to form a direct link.

The power controller 602 is also configured to wake the telematics gateway periodically to clear a received message buffer 606a of the satellite communications modem and process messages received when the modem was online if the telematics gateway was in a low power mode and unable to process the message at the time it was received. The power controller 602 also checks the transmit buffer status of the modem and fills the transmit buffer with any additional messages that may have been queued waiting for available buffer space. In other words, messages which were generated while the modem was low power mode where it is either powered-off or in a non-operational are queued until the modem becomes operational again.

In some embodiments, the server 520 comprises a back office system which is configured to download from the satellite network operator 518 a satellite schedule which can be used to determine, based off a vehicle's current or predicted future geographic position, when satellites will be in view of that vehicle. The satellite scheduling information may be provided in the form of a suitable message as mentioned above, for example, a SWAP message, in some embodiments which is stored by the vehicle in memory 514, for example, in a vehicle data administration, VDA, database 622.

The received massage defines, in some embodiments, one or more intervals in a given 24 hour period where the vehicle's telematics gateway 608 shall interact with the modem buffer(s) 606a, 606b. This information may be used by the power controller 602 to determine when to wake-up the telematics platform in some embodiments. In some embodiments, when a system mode manager on the telematics gateway detects a request from the power controller 602 to enter a low power state, in other words a vehicle power mode in which the telematics gateway 608 is powered off, the system mode manage of the telematics gateway performs the following method: determine via it's inbuilt location, for example, global navigation satellite system, GNSS, capabilities the vehicle's current geographic location; determine based off the vehicle's current geographic location the next time a satellite will be visible, schedule a wake up to a system mode with the modem powered but the rest of the system on standby, in other words, to a StandbyWithNADPowered power mode when the satellite is overhead or sufficiently close to the vehicle to allow for vehicle-satellite communications (by which term herein is referred to bi-directional communications between a vehicle and a satellite), schedule a shutdown to a system mode with the modem unpowered when the satellite will no longer be overhead, and, based off the interval setting received above, schedule a wakeup to a fully powered system modem to read the message terminating, MT, buffer, in other words the incoming message buffer and add to the message outgoing, MO, buffer of the satellite communications modem.

FIG. 5 shows also an example of how a system can be implemented to provide a vehicle satellite-communications scheduler for scheduling vehicle satellite-communications for a vehicle having a power controller. The scheduler is configured, responsive to the power controller receiving a low power mode request, to determine a geographic location of the vehicle, determine a time when a satellite will next be available for vehicle satellite-communications based on the determined geographic location of the vehicle; and configure the power controller to schedule a modem power mode wake-up at the determined time.

In some embodiments, the vehicle satellite-communications scheduler is also configured to determine a time when the satellite will become unavailable after the next time it becomes available and to configure the power controller to schedule a modem low power mode at the time when the satellite will become unavailable.

The scheduler may be an on-board scheduler in some embodiments, but in some embodiments may extend to include a source such as 520 shown in FIG. 5 of satellite scheduling information which is provided off-board by a remote server or to a satellite orbit information source such as that shown in FIG. 5 as 518.

The system components of the vehicle shown in FIG. 6 may as implement an on-board vehicle-satellite communications scheduling system in some embodiments. For example, some embodiments of the on-board vehicle-satellite communications scheduling system comprise a power controller 602 configured to control a satellite communications modem 604 of the vehicle 14 independently from a telematics gateway 608 of the vehicle and a satellite-communications scheduler is provided by compute code stored in memory 614 which, when loaded from memory 614 and executed by the one or more processor(s) or processing circuitry 616, determine, based on a geographic location of the vehicle, where the term geographic location may include information representing the local terrain.

In addition, in some embodiments, to using satellite orbit data to determined when the vehicle and satellite will be able to form a direct link, one or more characteristics of the satellite such as its network coverage may be used to determine the duration of any time window for vehicle-satellite communications during which a direct communications link can be established between the vehicle and the satellite. The system may also generate a request which is processed by the power controller to wake-up the satellite communications modem 604 of the vehicle 12 at each scheduled time when the direct communications link with the satellite can be established. The power controller is configured, responsive to receiving the request, to cause the satellite communications modem to change from a lower power mode to wake-up and operate at the scheduled time without changing the telematics gateway power mode.

Some embodiments of the vehicle shown in FIG. 6 comprise an ECU 618 which comprises a control system or circuitry for implementing a method according to any of the disclosed embodiments. For example, some embodiments of the ECU 18 include or use memory 614 (shown separately in FIG. 6) and the one or more processors or processing circuitry (also shown separately in FIG. 6). Computer-program code is stored in the memory 614 of or used by the ECU 618 and, when loaded from the memory 614 and executed by the one or more processors or processing circuitry 618 of the ECU 618 under the control of the ECU, results in the vehicle 12 implement a method according to the disclosed technology.

As shown in FIG. 6, the vehicle comprises in addition to the modem and modem buffers, a telematics gateway, a satellite communications modem; an electronic control unit. In some embodiments, the vehicle is configured to provide an on-board vehicle satellite-communications scheduling system by generating satellite scheduling information based on satellite orbit information received from a source 518 or from a back-office server 520 as mentioned above. The power controller 602 of the vehicle 12 is configured to independently power at least the satellite communications modem 604 from the telematics gateway of the vehicle. Responsive to the power controller 602 receiving a request for the telematics gateway 608 of the vehicle 12 to go to a lower power mode, the scheduling system determines, based on a current geographic location of the vehicle and orbit information for the satellite, a time when a direct-link with an over-head satellite will next be available and requests the power controller schedules a modem power mode wake-up at the determined time and a subsequent shutdown of the modem to a low-power mode when the direct-link with a satellite is no longer available.

In some embodiments where satellite communications modem 604 includes an incoming message modem buffer, the modem buffer 606a is configured to store messages received via a satellite link with the satellite when the telematics gateway 608 is in a low-power state. In some embodiments, the modem includes an outgoing message modem buffer 606b, wherein the telematics gateway is configured to interact with the modem buffer to cause out-going messages to be stored in the modem buffer when the modem is in the low-power state.

In FIG. 6, the electronic control unit 618 may comprises a control system or circuitry for a vehicle which uses memory 614, one or more processors or control circuitry 616; and computer-program code which, when loaded from memory 614 and executed by the one or more processors or processing circuitry 616 causes the vehicle 12 implement an embodiment of the method of scheduling a time-window for vehicle-satellite communications as disclosed herein.

Figure 7:
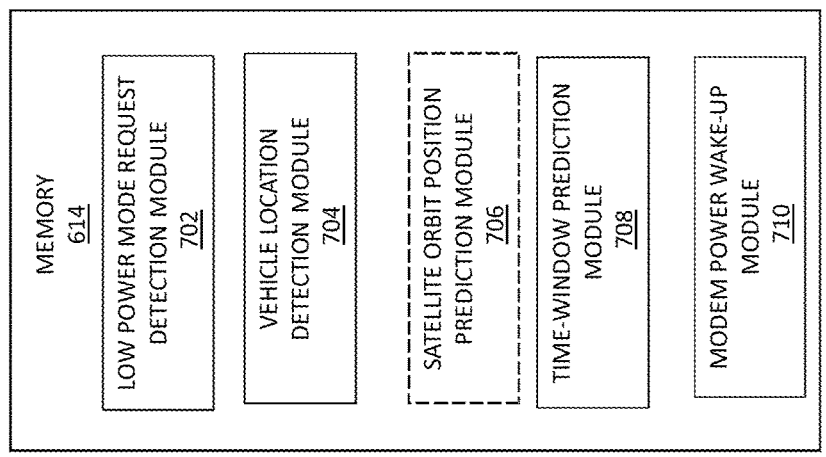
FIG. 7 illustrates schematically a computer program product according to some embodiments of the disclosed technology.

FIG. 7 shows schematically an example of a computer program product according to an embodiment of the disclosed technology comprising computer-code which when loaded from memory 612 and executed by one or more processors or processing circuitry 616 of a control system or circuitry such as the ECU 618 shown in FIG. 6 of a vehicle 12 to provide an on-board vehicle-satellite scheduler according to some embodiments of the invention. The execution of the code stored in the memory 614 of FIG. 7, causes the vehicle to implement a method of scheduling vehicle-satellite communications according to some of the disclosed embodiments. For example, as shown in FIG. 7, memory 614 store one or more computer code modules comprising software or circuitry, where a low power mode request detection module 702, a vehicle location detection module 704, a satellite orbit position prediction module 706 (which may be located instead on a back-office server such as is shown in FIG. 5 rather than on the vehicle 12), a time-window predictor module 708, and a modem power wake-up module 710 may be configured to implement an embodiment of the method disclosed herein.

In some embodiments, the vehicle 12 may be is an autonomous vehicle with an ADS configured to make tactical decisions for a control system. The vehicle may be a heavy-duty vehicle. A heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine. The autonomous operation of a heavy-duty vehicle is accordingly more complex than the autonomous operation of a more light-weight vehicle such as a car.

Some, if not all, of the above embodiments may be implemented using computer program code which may be provided as software or hardcoded, for example, as a computer program product configured to be used by a device mounted on or integrated in a vehicle. In some embodiments, the computer program product comprises computer-code which when executed by one or more processors of the vehicle, causes the vehicle to implement a method for scheduling vehicle-satellite communications according to any one of the disclosed embodiments.

The program code mentioned above may also be provided as a computer program product, for instance in the form of a data carrier carrying computer program code or code means for performing the embodiments herein when being loaded into the processing circuitry in a control unit such as ECU 618 of the vehicle 12. The data carrier, or computer readable medium, may be one of an electronic signal, optical signal, radio signal or computer-readable storage medium. The computer program code may e.g. be provided as pure program code in the control unit 618 or on a server and downloaded to the control unit 618. Thus, it should be noted that the functions of the control unit 618 may in some embodiments be implemented as computer programs stored in memory 614, for example, a computer readable storage unit, for execution by processors or processing modules, e.g. the processing circuitry 616 in the control unit 618 of FIG. 6.

Those skilled in the art will also appreciate that the processing circuitry 616 and the memory or computer readable storage unit 614 described above may refer to a combination of analog and digital circuits, and/or one or more processors configured with software and/or firmware, e.g. stored in a memory, that when executed by the one or more processors such as the processing circuitry 616 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The control unit 618 also comprises or is capable of controlling how signals are sent wirelessly via suitable RX/TX/antenna arrangement in order for the vehicle 12 to communicate via one or more communications channels including satellite communications with remote entities. For example, the vehicle 12 may communicate with remote entities such as a site back office and/or a server 520 to obtain satellite scheduling data as shown in FIG. 5 or directly communicate with a source of satellite information 518 in which case the vehicle may generate the scheduling information on-board. An antenna or antenna array 611 used for wireless communications, for example, with the satellite may be driven directly from the control circuitry or chip or, alternatively, it could be contained within a transceiver system such as is shown in FIG. 6 as RX/TX unit 612 comprising the logical and physical components for sending and receiving, including antennas, amplifiers, digital logic circuits. Powering and/or waking up the modem to transmit signals may power up essential system components such as the antenna which are required to send communications signals if these are not already operational.

The communication channels may be point-to-point, or networks, for example, over cellular or satellite networks which support wireless communications. The wireless communications may conform to one or more public or proprietary communications standards, protocols and/or technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The operating system of the vehicle may further various software components and/or drivers for controlling and managing general system tasks (e.g., memory management, storage device control, power management, etc.) and facilitates communication between various hardware and software components.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for the purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory.

Unless not suitable for the application at hand, memory may also be distributed over a various forms of memory and storage components, and may be provided remotely on a server or servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprises a plurality of different memory modules, including modules located on other network nodes in some embodiments.

In the drawings and specification, there have been disclosed exemplary aspects of the disclosure. However, many variations and modifications can be made to these aspects which fall within the scope of the accompanying claims. Thus, the disclosure should be regarded as illustrative rather than restrictive in terms of supporting the claim scope which is not to be limited to the particular examples of the aspects and embodiments described above. The invention which is exemplified herein by the various aspects and embodiments described above has a scope which is defined by the following claims.

The invention claimed is:

1. A method for scheduling vehicle-satellite communications for a vehicle comprising a power controller configured to provide power to a satellite communications modem of the vehicle independently of power provided to a telematics gateway of the vehicle,
wherein both the satellite communications modem and the telematics gateway are powered independently from the rest of the vehicle,
the method comprising:
responsive to the power controller of a vehicle receiving a low power mode request and based on a schedule for when a satellite is visible along a line of sight to the vehicle,
determining, by the vehicle, a geographic location of the vehicle;
determining, by the vehicle, at least a start time when a satellite will next be available for vehicle satellite-communications based on the determined geographic location of the vehicle to have line of sight communications with the satellite; and
configuring, by the vehicle, the power controller to schedule a modem power mode wake-up of the satellite communications modem at the determined start-time.

2. The method of claim 1, further comprising:
determining a time when the satellite will become unavailable after the next time it becomes available; and
configuring the power controller to schedule a start of a modem low power mode at the time when the satellite will become unavailable,
wherein the power controller is also configured to cause the telematics gateway to enter and wake from low power modes from time to time, wherein at least some telematics gateway low power modes are at different times to the times when the satellite communications modem enters and wakes up from its low power mode.

3. The method of claim 1, wherein the low power mode request is a low power mode request for vehicle system components including the telematics gateway and the satellite communications modem of the vehicle.

4. The method of claim 1, wherein the scheduled modem power mode wake-up wakes up the satellite communications modem of the vehicle when the telematics gateway of the vehicle is powered-off.

5. The method of claim 1, wherein the satellite communications modem comprises an independently powered incoming message buffer, and the method further comprises:
maintaining the incoming message buffer independently powered operable when the telematics gateway is in a low-power state;
storing at least one incoming message received via a vehicle-satellite communications link when the telematics gateway is in the low-power state, and
wherein the telematics power mode wake-up wakes up the telematics gateway when the satellite communications modem is powered-off and the telematics gateway is configured to check for received messages stored in the incoming buffer when it wakes up.

6. The method of claim 1, wherein the satellite communications modem comprises an independently powered outgoing message buffer, wherein the method further comprises:
powering the telematics gateway to interact with the outgoing message buffer to cause messages to be stored in the outgoing message buffer when the satellite communications modem is operating in the low-power mode.

7. The method of claim 1, wherein the satellite communications modem comprises an independently powered incoming message buffer, and the method further comprises:
maintaining the incoming message buffer independently powered operable when the telematics gateway is in a low-power state;
storing at least one incoming message received via a vehicle-satellite communications link when the telematics gateway is in the low-power state, and
wherein the telematics power mode wake-up wakes up the telematics gateway when the satellite communications modem is powered-off and the telematics gateway is configured to check for received messages stored in the incoming buffer when it wakes up, and
wherein the method further comprises scheduling a time-interval for the telematics gateway to interact with the incoming message buffer when the satellite communications modem is in the low-power mode.

8. The method of claim 1, wherein the satellite communications modem comprises an independently powered outgoing message buffer, wherein the method further comprises: powering the telematics gateway to interact with the outgoing message buffer to cause messages to be stored in the outgoing message buffer when the satellite communications modem is operating in the low-power mode and wherein the method further comprises scheduling a time interval for the telematics gateway to enable storage of outgoing messages in the outgoing message buffer when the satellite communications modem is in the low-power mode.

9. The method of claim 1, wherein the satellite communications modem comprises an independently powered outgoing message buffer, wherein the method further comprises: powering the telematics gateway to interact with the outgoing message buffer to cause messages to be stored in the outgoing message buffer when the satellite communications modem is operating in the low-power mode and wherein the method further comprises scheduling a time interval for the telematics gateway to enable storage of outgoing messages in the outgoing message buffer when the satellite communications modem is in the low-power mode and wherein the method further comprises:
automatically emptying the outgoing message buffer of the satellite communications modem of the vehicle when the satellite communications modem is powered on and a vehicle-satellite communications link is available.

10. A vehicle satellite-communications scheduler for scheduling vehicle satellite-communications for a vehicle having a power controller configured to provide power to a satellite communications modem of the vehicle independently of power provided to a telematics gateway of the vehicle, wherein both the satellite communications modem and the telematics gateway are powered independently from the rest of the vehicle, wherein the scheduler is configured, responsive to the power controller receiving a low power mode request and based on a schedule for when a satellite is visible along a line of sight to the vehicle to:
determine a geographic location of the vehicle;
determine at least a start time when a satellite will next be available for vehicle satellite-communications based on the determined geographic location of the vehicle to have line of sight communications with the satellite; and
configure the power controller to schedule a modem power mode wake-up of the satellite communications modem at the determined start-time.

11. The vehicle satellite-communications scheduler of claim 10, wherein the scheduler is further configured to:
determine a time when the satellite will become unavailable after the next time it becomes available; and
configure the power controller to schedule modem low power mode of the satellite communications modem and a telematics low power mode for the telematics gateway at the time when the satellite will become unavailable, and to wake the telematics gateway from its low power mode from time to time whilst the satellite communications modem remains in its low power mode.

12. An on-board vehicle satellite-communications scheduling system, the communications scheduling system comprising:
a power controller configured to control a satellite communications modem of a vehicle independently from a telematics gateway of the vehicle;
a vehicle satellite-communications scheduler according to claim 10, wherein the vehicle satellite-communications scheduler is configured to
determine, based on a geographic location of the vehicle, a start-time for when a direct communications link can be established with a satellite using the satellite communications modem of the vehicle;
generate a power request to wake-up the satellite communications modem of the vehicle at a scheduled start time when the direct communications link with the satellite can be established; and
send the request to the power controller,
wherein the power controller is configured, responsive to receiving the request, to cause the satellite communications modem to change from a lower power mode to wake-up and operate at the scheduled start time without changing a telematics gateway power mode of the telematics gateway of the vehicle.

13. The on-board vehicle satellite-communications scheduling system of claim 12, wherein the system is configured to perform.

14. A vehicle comprising:
a telematics gateway;
a satellite communications modem;
an electronic control unit; and
an on-board vehicle satellite-communications scheduling system according to claim 12; and
a power controller configured to power at least the satellite communications modem independently from powering the telematics gateway of the vehicle,
wherein responsive to the power controller receiving a request for the telematics gateway of the vehicle to go to a telematics lower power mode, the scheduling system:
determines, based on a current geographic location of the vehicle, a start time when a direct-link with an overhead satellite will next be available, and
requests the power controller schedules a modem power mode wake-up of the satellite communications modem at the determined start time and a subsequent shutdown of the satellite communications modem to a low-power mode when the direct-link with a satellite is no longer available.

15. The vehicle of claim 14, wherein the satellite communications modem includes an out-going modem buffer, wherein the telematics gateway is configured to interact with the modem buffer to cause out-going messages to be stored in the out-going modem buffer when the satellite communications modem is in the lower power mode.

16. The vehicle of claim 14, wherein the satellite communications modem includes an incoming modem buffer, and the satellite communications modem is configured to cause, when the telematics gateway is in a low power state, incoming messages to be stored in the incoming modem buffer, wherein the incoming messages are made available to the telematics gateway when the satellite communications modem is in the low-power mode.

17. A control system for a vehicle, the control system comprising:
memory;
one or more processors or processing circuitry; and
computer-program code which, when loaded from memory and executed by the one or more processors, causes the vehicle to be configured to implement a method for scheduling vehicle-satellite communications for the vehicle, wherein the vehicle further comprises a power controller configured to provide power to a satellite communications modem of the vehicle independently of power provided to a telematics gateway of the vehicle, wherein both the satellite communications modem and the telematics gateway are independently powered from the rest of the vehicle, and wherein the computer-program code configures, responsive to the power controller of the vehicle receiving a low power mode request, the vehicle to:

determine a geographic location of the vehicle;

determine at least a start time when a satellite will next be available for vehicle satellite-communications based on the determined geographic location of the vehicle; and configure the power controller to schedule a modem power mode wake-up and/or a telematics power mode wake-up at the determined start-time.

18. A non-transitory computer program product comprising computer-code which when loaded from memory and executed by one or more processors of a control system or circuitry of a vehicle, causes the vehicle to implement a method for scheduling vehicle-satellite communications for a vehicle comprising a power controller configured to provide power to a satellite communications modem of the vehicle independently of power provided to a telematics gateway of the vehicle, wherein both the satellite communications modem and the telematics gateway are powered independently from the rest of the vehicle, the method comprising:

responsive to the power controller of a vehicle receiving a low power mode request and based on a schedule for when a satellite is visible along a line of sight to the vehicle, determining, by the vehicle, a geographic location of the vehicle;

determining, by the vehicle, at least a start time when a satellite will next be available for vehicle satellite-communications based on the determined geographic location of the vehicle to have line of sight communications with the satellite; and configuring, by the vehicle, the power controller to schedule a modem power mode wake-up of the satellite communications modem at the determined start-time.

* * * * *